Figure 1:
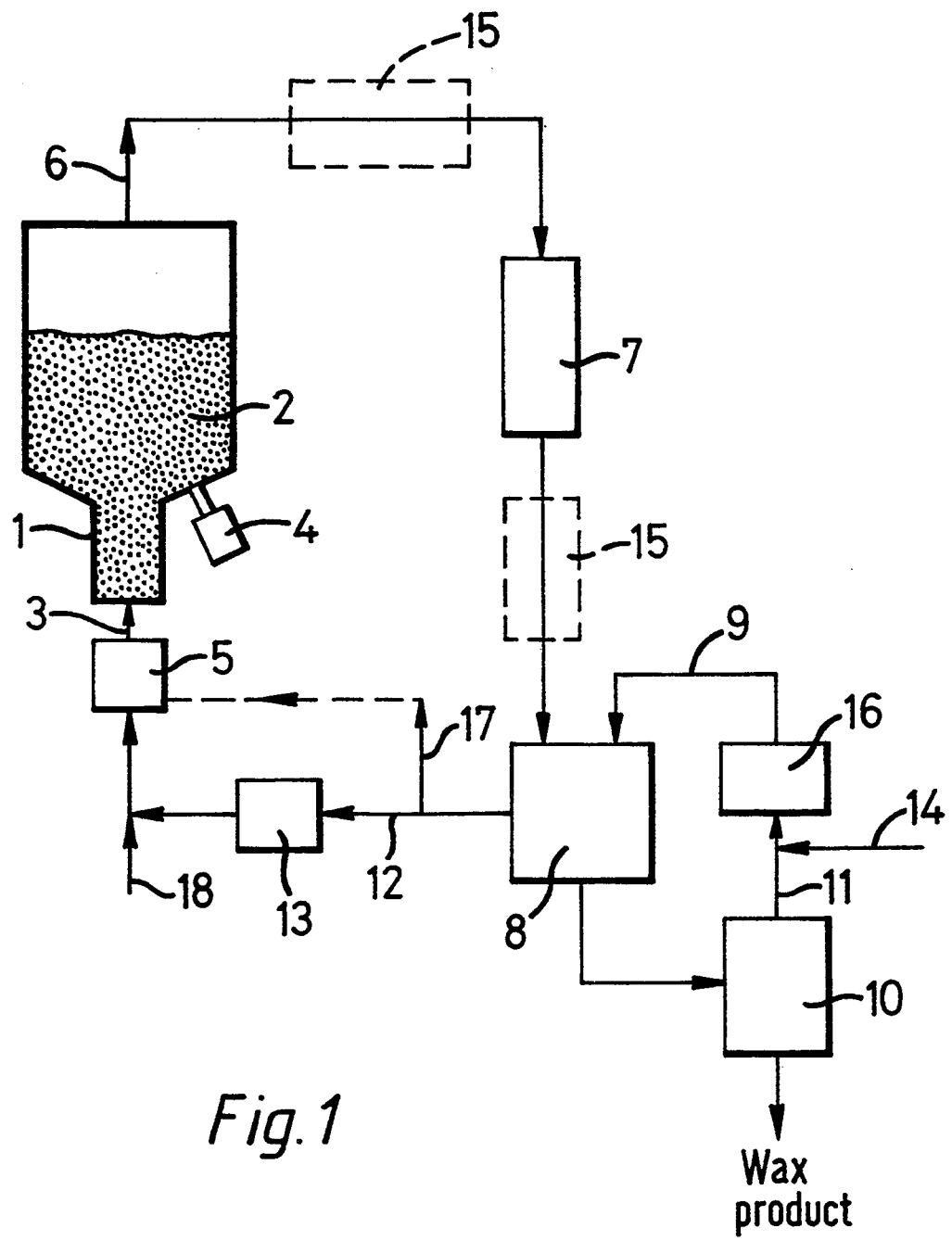

United States Patent [19]

Kirkwood et al.

[11] Patent Number: 5,364,995
[45] Date of Patent: Nov. 15, 1994

[54] POLYMER CRACKING

[75] Inventors: Kenneth C. Kirkwood, Stirlingshire; Stephen A. Leng, Livingston; David W. Sims, Forgandenny, all of United Kingdom

[73] Assignee: BP Chemicals Limited, London, England

[21] Appl. No.: 844,256

[22] Filed: Mar. 2, 1992

[30] Foreign Application Priority Data

| Mar. 5, 1991 | [GB] | United Kingdom | 9104604.5 |
| Aug. 21, 1991 | [GB] | United Kingdom | 9118025.7 |
| Aug. 21, 1991 | [GB] | United Kingdom | 9118026.5 |

[51] Int. Cl.$^5$ ............................ C07C 1/00; C07C 4/00
[52] U.S. Cl. .................................... 585/241; 585/648
[58] Field of Search ............... 585/241, 648, 649, 650

[56] References Cited

U.S. PATENT DOCUMENTS

| 3,843,339 | 10/1974 | Saito . | |
| 3,901,951 | 8/1975 | Nishizaki | 585/241 |
| 3,945,810 | 3/1976 | Saito . | |
| 4,143,086 | 3/1979 | Carle et al. . | |
| 4,147,593 | 4/1979 | Frischmuth et al. | 201/21 |
| 4,515,695 | 5/1985 | Krupp, Jr. . | |
| 4,822,573 | 4/1989 | Timmann | 422/143 |

FOREIGN PATENT DOCUMENTS

| 0276081 | 1/1988 | European Pat. Off. . |
| 2201337 | 9/1973 | France . |
| 2613721 | 4/1987 | France . |
| 369899 | 7/1957 | Germany . |
| 3819699 | 8/1989 | Germany . |

OTHER PUBLICATIONS

"Recycling of Plastics", *Conservation & Recycling*, vol. 1, pp. 91–100, Pergamon Press, 1976.

*Primary Examiner*—Asok Pal
*Assistant Examiner*—P. Achutamurthy
*Attorney, Agent, or Firm*—Brooks Haidt Haffner & Delahunty

[57] ABSTRACT

This invention relates to a process for the conversion of waste and/or fresh polymers, especially polyolefins, into lower hydrocarbons by vaporizing them in a fluidized bed of particulate material in the presence of a fluidizing gas at a temperature from 300°–690° C. The lower hydrocarbons can be further converted to useful olefins, paraffins or waxes by steam cracking the lower hydrocarbons, preferably in the absence of any catalyst. This is an effective and efficient method of recycling waste polymers.

15 Claims, 4 Drawing Sheets

KEY:  HG04  Steam cracker
      H1    Preheat exchanger
      H2    Heat exchanger for start-up
      T.L.X. Transfer line exchanger

POLYMER CRACKING

This invention relates to a process for producing one or more of light olefins, paraffins, naphthenes, olefin oligomers and waxes from waste and fresh polymers particularly polyolefins and the uses of waxes so produced particularly as refinery feedstock components.

Waste polymers such as polyolefins represent an under-exploited source of recyclable energy and new and raw materials. Several attempts have been made to convert waste polymers into fuel, recyclable plastics and monomers, for example for the purposes of re-polymerisation.

It is known to thermally degrade polymers such as polyolefins to produce waxes. Thus, for example:

U.S. Pat. No. 3,519,609 describes a process for the production of low viscosity synthetic waxes by heating high molecular weight polyolefins at 200° to 400° C. in the absence of oxygen and in the presence of a saturated organic anhydride catalyst.

GB-A-1108295 describes a process for the production of wax-like ethylene (co)-polymers by the thermal decomposition of high molecular weight polymers in the absence of air and oxidising agents in which the high molecular weight polymers are mixed with a melt of already decomposed polyethylene (co)-polymer.

FR-A-2613721 describes a process for the production of synthetic waxes by the thermal decomposition of polyethylenes and polypropylenes at 360° to 500° C. In a preferred embodiment the polyethylene or polypropylene is injected into a heated steel tube in the presence of steam.

FR-A-2480287 describes a process for the production of polyolefin wax by continuously extruding polyethylene through a heated reactor.

BE-828-159 describes a process for preparing waxy polyethylenes by cracking polyethylene residues at 350° to 385° C., for example by pumping a molten mixture through a heated tubular coil.

J-A-48075680 describes thermal decomposition of synthetic polymers by melting and transporting through varied conditions.

DT-2222267 describes converting polymer waste into fuels using a screw melt extruder.

J-A-55071789 describes thermal cracking of plastics to obtain an oligomer and hydrocarbon oil in which the temperature of the reaction zone is regulated.

It is known to degrade polymers to olefins at temperatures above 690° C. in a fluidised bed reactor. For example, Kaminsky, W et al in Conservation & Recycling, vol. 1, pp 91–110 Pergamon Press 1976 describes recycling of plastics using fluidised beds to form lower olefins and aromatics.

It has now been found that polymers can be thermally degraded in a fluidised bed reactor to produce lower hydrocarbons which can be used for, amongst other things, refinery feedstock components particularly for crackers.

Accordingly, the present invention is a process for producing lower hydrocarbons from waste and/or fresh polymer by pyrolysis, said process comprising vaporising the waste/fresh polymer in the presence of a fluidising gas and a fluidised bed of a solid particulate fluidisable material inert to the hydrocarbon reactants and products under the reaction conditions in a reactor at a temperature from 300°–690° C. to form by pyrolysis a mixed vapour of lower hydrocarbons.

The expression "lower hydrocarbons" as used herein and throughout the specification is meant to include one or more of light olefins, paraffins, naphthenes, olefin oligomers and waxes which have a significantly lower molecular weight than the polyolefins being converted thereto.

The polymers referred to herein are substantially polyolefins such as e.g. polyethylene, polypropylene, polystyrene and copolymers thereof. For the purposes of the present invention polymers containing groups other than carbon or hydrogen e.g. PVC, poly(vinyl fluoride), polyesters, polyamides and poly(vinyl acetate) are not to be considered, whether waste or fresh, for the purposes of recycling according to the present invention.

Thus, the polymers being recycled according to the process of the present invention suitably contain no more than 10% w/w, preferably less than 5% w/w, more preferably less than 1% w/w of the polymers containing groups other than carbon and hydrogen.

The mixed vapour of lower hydrocarbons can be treated in several ways. For instance, the mixed vapour of lower hydrocarbons can be cracked in a cracker at a temperature of at least 600° C. in the presence of steam optionally in the presence of, preferably in the substantial absence of, a catalyst added from an external source to form light olefins, paraffins, olefin oligomers and/or a wax having a molecular weight below 3000, suitably from 100–1000.

As is evident from the above, some of the chemicals present in the waste polymers may have inherent cracking ability. The present invention does not visualise the removal of such catalytically active chemicals inherently present in such waste prior to cracking.

If the predominant product in the mixed vapour of lower hydrocarbons is a wax, the latter can be used as a refinery feedstock, for example as a feedstock component to hydro-, steam-, or catalytic-crackers. The wax may be converted to useful lower olefins in a steam cracker at 750° to 850° C.; to gasoline in a catalytic cracker and upgraded in a hydrocracker. Production of the wax as an intermediate product between the polymer degradation stage and the cracker provides flexibility. Thus the wax may be easily transported as solid, liquid or in solution between the fluidised bed reactor and the cracker which may thus be located remotely from the reactor. Also, it is believed that the wax may be lower in non-hydrocarbon components than the original polymer, making it a more suitable feedstock component for crackers and the like than the original polymer.

The polymer feed to the fluidised bed reactor may be fresh or waste polymer, preferably waste polymer. A suitable source of waste polymer is from plastics packaging. Such waste polymer may comprise co-mingled waste polyethylene, polypropylene, ethylene vinyl alcohol-laminated films and the like.

The polymer introduced to the fluidised bed reactor, preferably comprises one or more polyolefins, for example polyethylene, polypropylene, copolymers of propylene and ethylene and the like. High, low and/or linear densities of polyolefin may be used.

If the wax product is to be relatively low in aromatics content, for example for use in a steam cracker feedstock, it is desirable that the polystyrene content of the polymer introduced to the fluidised bed reactor is less than 5% by weight, preferably less than 3% by weight. It is also desirable that the polymer feed be essentially free of non-hydrocarbon contaminants, for example, that the polyvinyl chloride (PVC) content of the polymer feed be less than 1% by weight. It is also desirable that the ethylene-vinyl alcohol or polyester (for example, polyethylene terephthalate) content be less than 1% by weight.

The polymer should preferably be shredded into pieces which are able to be screw-fed into the reactor and which are fluidisable in the fluidised bed reactor. Pieces having dimensions of about 2 cm by 4 cm long may be suitable for feeding into a commercial scale reactor and for vaporising the polymer in the reactor.

Prior to pyrolysis in the reactor the polymer can be mixed with a paraffinic feedstock. The paraffinic feedstock is suitably free of any substantial amounts of olefinic, acetylenic or aromatic hydrocarbons for optimum performance. The paraffinic feedstock may be naphtha, gas oils (bp 250°–340° C.) and feeds rich in butane and/or propane.

The waste polymer and the paraffinic feedstock can be fed into the reactor premixed, simultaneously or sequentially. The one important criterion is that they are in the vapour state together in the reactor for maximum efficiency. Thus the polymer may be vaporised using a feed of hot naphtha vapours generated e.g. in the convective section of a thermal cracker. The ratio of the waste polymer to the paraffinic feedstock in the reactor is suitably such that the emergent mixed vapour stream fed to the cracker suitably contains 5–50% w/w of the waste polymer, preferably from 10–35% w/w, more preferably 15–30% w/w. These proportions are particularly suitable when using a fluidised sand bed.

The solid fluidisable material of the fluidised bed reactor is inert to the hydrocarbon reactants and products under the reaction conditions and may be quartz sand, silica, ceramics, carbon black, aluminosilicates and the like. Preferably, the solid fluidisable material is catalytically inert towards the polymer and fluidising gas. The fluidisable material suitably comprises particles of a size capable of being fluidised, for example 100 to 2000 $\mu$m.

The fluidised bed reactor is supplied with a heated fluidising gas. Preferably, the fluidising gas is free of molecular oxygen and other oxidising materials, particularly when the wax product is intended as a cracker feedstock component. A suitable fluidising gas is nitrogen or a gas comprising nitrogen such as a refinery fuel gas which is a mixture comprising hydrogen, nitrogen and aliphatic hydrocarbons, principally $C_1$ to $C_6$ hydrocarbons. A preferred fluidising gas is recycle gas which may be obtained by removing wax and other liquid products from the gaseous effluent from the fluidised bed reactor and which comprises mainly $C_1$ to $C_4$ alkanes and alkenes. Recycle gas may be used with or without nitrogen or other fluidising gases. In a particularly preferred embodiment of the present invention fuel gas may be used initially as fluidising gas until sufficient recycle gas is produced to replace the fuel gas, the system thereafter generating its own fluidising gas. Hydrogen may also be present in the fluidising gas for hydrogenation of the wax product either in the fluidised bed reactor or, preferably in a downstream catalyst bed. Steam may also be present in the fluidising gas to assist heat transfer.

The fluidised bed is maintained at a temperature of above 300° and below 690° C., preferably at about 450° to 600° C., more preferably at about 500° to 550° C. by the heated fluidising gas and optionally additional heating means inside or outside the reactor. The fluidising gas is preferably heated to about 300° to 700° C., more preferably about 650° C. The fluidised bed may be operated at sub-atmospheric, superatmospheric or atmospheric pressure, preferably near atmospheric pressure.

The ratio of polymer to fluidising gas will depend upon various parameters, for example the type of fluidisable solid bed material but for quartz sand, for example may be in the range 1:1 to 1:20, preferably about 1:1 to 1:10 by weight.

Residence time of the polymer in the fluidised bed reactor will depend upon such parameters as the particle size, bed operating temperatures and fluidising rate. For 2 mm diameter by 4 mm long pellets of polymer residence times varied from a few seconds to about 8 minutes in a small fluidised bed operated at 450° to 550° C.

The fluidised bed may be provided with particulate alkaline solids such as alkaline earth metal oxides, for example calcium oxide in order to trap any unwanted acidic vapours such as hydrogen chloride from polyvinyl chloride present in the polymer feed, which may otherwise present a risk of corrosion to the equipment. A proportion of such fluidisable solid material may be removed from the bed and replaced with fresh material as the alkaline solids react with acidic vapours.

The wax product is removed as a vapour, together with fluidising gas and other products in the gaseous effluent from the reactor. This gaseous effluent is preferably passed through a cyclone separator to remove fines. The gaseous effluent may then be passed through a bed of alkaline solid (scrubbed) to remove any residual traces of unwanted acidic vapours.

The gaseous effluent after optional scrubbing, is cooled to yield the wax product which may be recovered by conventional means. Preferably the gaseous effluent is cooled by quenching, preferably with liquid, the undissolved gases may then be recycled, reheated and reintroduced to the reactor as part or all of the fluidising gas. Part or all of the undissolved gases may also be used as fuel gas. Suitable quenching liquids are water or organic solvents. Cooling means such as heat exchangers may be used in place of or in addition to quenching. If the wax is insoluble in the quenching liquid it may be recovered by phase separation or the like. If the wax is soluble in the quenching liquid it may be used as a solution or recovered by conventional means such as solvent evaporation, distillation or the like.

In a particularly preferred embodiment the scrubbed gaseous effluent may be quenched with naphtha in which the wax product is soluble with additional cooling by means of a heat exchanger, if required. The naphtha/wax mixture may be used as a refinery feedstock, for example it may be fed to a steam cracker operating at 750° to 850° C. to produce reusable olefins or fed to a catalytic cracker to produce gasoline or upgraded in a hydrocracker or even fed to a coker. In this way waste polymers may be converted into useful refinery feedstock components.

The waxes produced by the process of the present invention may have a molecular weight ($M_n$) in the range 100–1000.

The waxes produced by the process of the present invention may be used not only as cracker feedstock components but also as mould release agents, lubricants, transport fuels, polishes, paint and ink additives and the like.

In a further embodiment of the present invention saturated or partially saturated waxes may be produced by contacting the wax produced in the fluidised bed reactor with hydrogen and a suitable hydrogenation catalyst at elevated temperature. Suitable catalysts include nickel catalysts and the like. In a preferred embodiment hydrogen is present in the fluidising gas feed to the fluidised bed reactor, and after optional removal of e.g. acidic impurities by scrubbing, the hydrogen/wax gaseous effluent from the reactor is passed through a catalyst bed to saturate or partially saturate the wax. Alternatively, wax product may be recovered from the reactor, optionally after quenching, and hydrogenated in a separate process by known methods. If the mixed vapour of lower hydrocarbons is to be steam cracked to lighter olefins, it is preferable that the polymer is vaporised using a feed of hot naphtha vapours generated e.g. in a convective section of a thermal reactor under pressure as the fluidising gas.

In this case, the mixed vapours of lower hydrocarbons from the reactor can be "dry scrubbed" to remove any acidic impurities and then fed to a steam cracker. The ratio of steam to the mixed vapours fed to the cracker is suitably from 0.2:1 to 1:1 w/w, preferably from 0.3:1 to 0.6:1 w/w. The steam cracker is operated at temperatures at or above 600° C. in the absence of any catalyst added from an external source.

The mixed vapours may be mixed with hydrogen prior to steam cracking. This will aid the reduction of any tendency to form coke in the steam cracker.

The steam cracking is suitably carried out at a temperature above 700° C., preferably 750°–850° C. for optimum results. The steam cracked product predominantly comprises olefins which can be used, optionally after purification, for producing e.g. a fresh batch of olefins oligomers or polymers.

This method has considerable advantages over the prior art in that no catalysts need be employed and no significant oxidation of the polymer occurs. Hence the resultant olefins are substantially uncontaminated when compared with the processes used hitherto.

Figure 2:
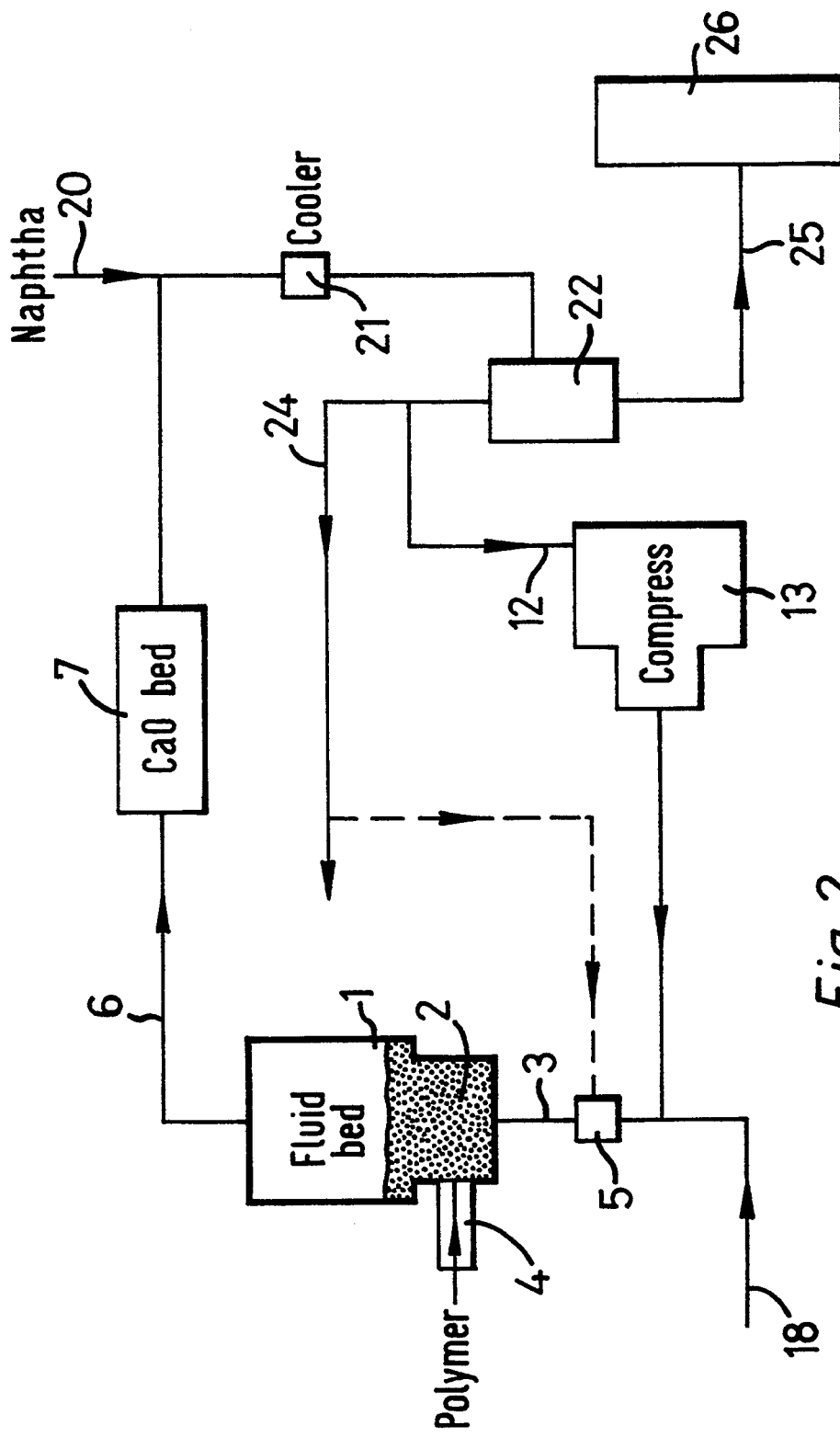

The invention will now be illustrated by reference to the following drawings and Examples in which FIG. 1 represents in simplified schematic form an apparatus for use in the process of the present invention for making waxes and FIG. 2 represents in simplified schematic form an apparatus for making wax/naphtha cracker feedstocks in a process according to the present invention.

Referring to FIG. 1, a fluidised bed reactor (1) is provided with solid fluidisable material (2), for example quartz sand. The reactor is provided with a supply (3) of fluidising gas comprising, for example initially at least in part a supply of fuel gas (18) and optionally including hydrogen. There is provided a heater (5) for heating the fluidising gas. A screw feed (4) is provided for feeding polymer into the reactor (1). An outlet (6) is provided for passing gaseous effluent from the reactor (1) to an alkaline solid bed scrubber (7). A quencher (8) is provided for quenching the scrubbed gaseous effluent from the reactor. The quencher (8) is provided with a supply (9) of liquid quenchant, conventional/separation means shown as (10) for separating wax from quenchant and a line (11) for recycling recovered quenchant through cooler (16) as a supply (9) of quenchant. A supply (14) of fresh quenchant is also provided.

The conventional separation means (10) may comprise phase separation, if the wax is insoluble in the quenchant, for example water, or by solvent evaporation, distillation or like means if the wax is soluble in the quenchant, for example an organic solvent. Depending upon the intended use of the wax, separation may not be required.

A compressor (13) is provided for compressing undissolved gases which pass along line (12) from the quencher (8), for use as fluidising gas.

An optional catalyst bed (15) comprising, for example a nickel hydrogenation catalyst may be provided for hydrogenating or partially hydrogenating the wax if required, using hydrogen in the fluidising gas.

In use, a supply of fluidising gas (3), for example fuel gas from supply (18), optionally including hydrogen is passed through heater (5) which heats the gas to about 650° C. and into the reactor to fluidise the bed. Waste polymer is fed through screw feed (4) into the reactor where it degrades to form a vapour wax product. The wax product together with fluidising gas and other gaseous and vapour products passes out of the reactor as a gaseous effluent via a cyclone separator (not shown) along line (6) and through alkaline solid bed scrubber (7). The scrubbed gaseous effluent then passes to the quencher (8) where it is quenched by the liquid quenchant provided through line (9). Undissolved gases pass along line (12) as recycle gas, through compressor (13) and combine with and as they increase, optionally replace, the fuel gas (18) for fluidising the reactor bed. Excess recycle gas passes along line (17) for use as a fuel gas, for example to provide the heating for the fluidising gas by heater (5). The quenchant together with wax product passes to a conventional separation step shown schematically as (10). This may be filtration, if the wax is insoluble in the quenchant, for example water, or by solvent evaporation, distillation or the like if the wax is soluble in the quenchant, for example an organic solvent. Depending upon the intended use of the wax, separation may not be necessary. Recovered quenchant may pass along line (11), combine with fresh quenchant from line (14) and pass through optional cooler (16) before being recycled along line (9) to the quencher (8).

If saturated or partially saturated waxes are to be produced, the fluidising gas (3) may contain hydrogen which passes through the fluidised bed reactor. The hydrogen and wax product may then react on partial cooling in optional catalyst bed (15).

FIG. 2 illustrates a preferred embodiment of the present invention in which the wax is quenched from the vapour by naphtha refinery cracker feedstock. Items common to FIG. 1 have common reference numerals.

Referring to FIG. 2, a fluidised bed reactor (1) is provided with a solid fluidisable material (2), for example quartz sand. The reactor is provided with a supply (3) of fluidising gas comprising, for example initially, at least in part, a supply of fuel gas (18) and comprising optionally hydrogen. There is also provided a heater (5) for heating the fluidising gas. A screw feed (4) is provided for feeding polymer into the reactor. An outlet (6) is provided for passing gaseous effluent from the reactor (1) to an alkaline solid bed scrubber (7) containing calcium oxide. A supply (20) of naphtha is provided for combining with and quenching scrubbed gaseous effluent. A cooler (21) is also provided together with a separator (22) for the cooled quenched naphtha/wax material. The separator (22) is provided with an outlet (25) for naphtha enriched with wax for feeding to a cracker (26). The separator (22) is also provided with outlets (24) and (12) for undissolved gas. One outlet is for the undissolved gas for use as fuel gas, for example to supply the heater (5). The other line (12) is for recycle gas via compressor (13) for use as fluidising gas.

In use, a supply of fluidising gas (3), initially fuel gas from an external source (18), optionally including hydrogen is passed from the heater (5) which heats the gas to about 650° C. and into the reactor to fluidise the bed (2). Waste polymer is fed through screw feed (4) into the reactor where it degrades to form a vapour wax product. The wax product together with fluidising gas and other gaseous and vapour products passes out of the reactor as a gaseous effluent via a cyclone separator (not shown) along outlet line (6) and through the alkaline solid bed scrubber (7). The scrubbed gaseous effluent is then combined with naphtha from supply line (20) and passes through cooler (21) where the vapours are quenched and cooled. The cooled, quenched mixture passes to a separator (22). Undissolved gases from the separator pass along line (12), through a compressor (13) and combine with the fluid gas for recycle to the reactor (1). Some of the undissolved gases may be used as a fuel gas along line (24), for example to the heater (5).

After start-up using an external source of fuel gas (18), the fluidising gas (3) for the reactor bed may comprise only recycle gas from line (12).

Naphtha together with the wax product leaves the separator along line (25) for use as a cracker feedstock in cracker (26).

EXAMPLES 1-8

Preparation of Wax

A fluidised quartz sand bed reactor fluidised with nitrogen was used to produce waxes from several grades of polymer (polyethylenes supplied by BP Chemicals and polypropylene supplied by Appryl) at different temperatures, A 50 ml bed of quartz sand (106–180 μm size) in a 45 mm outside diameter quartz glass tube was used as the fluidised bed reactor. The reactor was provided with a three zone tubular furnace for heating to the required temperature (500° to 550° C.), the first zone being used to pre-heat the fluidising gas. Nitrogen was used as fluidising gas at 1.5 liter/min at NTP for 106 to 180 82 m sand. The bed was operated at atmospheric pressure.

Polymer pellets (about 2 mm diameter and 4 mm long) were dropped into the bed at the rate of 10 gram over 15 minutes.

Gaseous effluents for the reactor was passed through a wide bore glass 'U' tube cooled in a cardice bath. The collected wax products were analysed by Gel Permeation Chromatography (GPC) and melted at a temperature of typically 50° to 80° C. Other experiments showed that gaseous hydrocarbons found under the fluidising bed conditions were no more than 5% by weight at 550° C.

Results are shown in Table 1 in which $$M_N = \text{arithmetic mean molecular weight}$$
$$= \frac{\sum_{i=1}^{n}(N_i M_i)}{N_T}$$

$$M_W = \text{mass mean molecular weight}$$
$$= \sum_{i=1}^{n} x_i M_i$$

wherein
$x_i$ = mass fraction of given increment,
n = number of increments,
$M_i$ = average molecular weight in increment i,
$N_T$ = number of molecules in total sample,
$N_i$ = number of molecules in increment.

For the HDPE $M_N$=11000 and $M_W$=171000.

EXAMPLE 9

Example 1 was repeated using 180–250 μm sand, and a fluidising gas rate of 3.0 liter/min at NTP. $M_N$ of the wax product was 370 and $M_W$ was 540.

TABLE 1

| Example No. | Polymer Feed | Fluidised Bed Reactor Temperature °C. | $M_N$ | $M_W$ |
|---|---|---|---|---|
| 1 | High density polyethylene 002-05 | 500 | 410 | 580 |
| 2 | High density polyethylene 002-05 | 550 | 180 | 290 |
| 3 | Linear low density polyethylene 209 AA | 500 | 390 | 550 |
| 4 | Linear low density polyethylene 209 AA | 550 | 220 | 330 |
| 5 | Low density polyethylene BP 83 | 500 | 380 | 550 |
| 6 | Low density polyethylene BP 83 | 550 | 290 | 390 |
| 7 | Polypropylene | 500 | 690 | 915 |
| 8 | Polypropylene | 550 | 410 | 620 |

EXAMPLES 10-12

Co-Cracking of Naphtha and Wax Feedstocks

Wax produced in Example 1 was cracked with naphtha in a micro-cracker operating with a maximum temperature of 800° C. to 820° C. in the presence of steam.

The micro-reactor used consisted of a ⅛ inch nominal bore stainless steel tube in an electrically heated 24 inch tubular furnace. The cracker was operated at 5 psig with a coil outlet temperature of 820° C. with a contact time of 0.9 seconds. A small flow of helium (1 liter/hour) was maintained to the coil to provide pressure control. Naphtha, molten wax and water feed rates are shown in Table II. The cracked products were analysed using a Carle Analyser.

In Example 10 naphtha was cracked in the presence of steam. In Examples 11 and 12 wax and naphtha were co-cracked in the presence of steam. The results in Table III are for the cracking products of the wax alone, calculated by subtracting the known products from cracking the naphtha (Example 10) assuming the products to be additive. No coke detectable was deposited during the cracking and mass accountability was good. Conversion was estimated to be around 92%. Preliminary experiments have indicated that the highers comprise mainly cyclo-pentadiene, benzene, toluene and C8 aromatics.

A relatively low cracking severity was chosen giving olefin yields from naphtha similar to a commercial HG04 furnace modified to crack naphtha.

TABLE II

STEAM MICROCRACKING OF NAPHTHA/WAX MIXTURES

| Run | 1 | 2 | 3 |
|---|---|---|---|
| Feedrates (g/hr) | | | |
| naphtha | 4.2 | 2.8 | 2.8 |
| wax | 0 | 1.4 | 1.4 |
| water | 1.6 | 1.6 | 1.6 |
| Yields (% wt) | | | |
| hydrogen | 0.79 | 0.74 | 0.71 |
| methane | 10.26 | 11.15 | 11.17 |
| ethane | 3.05 | 3.35 | 3.39 |
| ethylene | 21.46 | 25.31 | 25.43 |
| acetylene | 0.20 | 0.21 | 0.21 |
| propane | 0.34 | 0.35 | 0.35 |
| propylene | 14.62 | 15.38 | 15.42 |
| $C_3$ acetylenes | 0.15 | 0.16 | 0.16 |
| isobutane | <0.1 | <0.1 | <0.1 |
| n-butane | 0.23 | 0.23 | 0.23 |
| butene-1 | 2.41 | 2.23 | 2.27 |
| isobutene | 2.19 | 1.56 | 1.59 |
| butene-2 | 0.88 | 0.89 | 0.91 |
| butadiene | 3.59 | 4.31 | 4.57 |
| isopentane | 1.97 | 1.15 | 1.17 |
| n-pentane | 3.10 | 2.01 | 2.33 |
| others (by difference) | 34.76 | 30.97 | 30.09 |

TABLE III

YIELD FROM WAX (average of runs 2 and 3)

| | |
|---|---|
| hydrogen | 0.60 |
| methane | 12.96 |
| ethane | 4.01 |
| ethylene | 33.19 |
| acetylene | 0.23 |
| propane | 0.37 |
| propylene | 16.96 |
| $C_3$ acetylenes | 0.18 |
| isobutane | 0.00 |
| n-butane | 0.23 |
| butene-1 | 1.93 |
| isobutene | 0.35 |
| butene-2 | 0.94 |
| butadiene | 6.14 |
| isopentane | −0.46 |
| n-pentane | 0.31 |
| others (by difference) | 22.07 |

Figure 3:
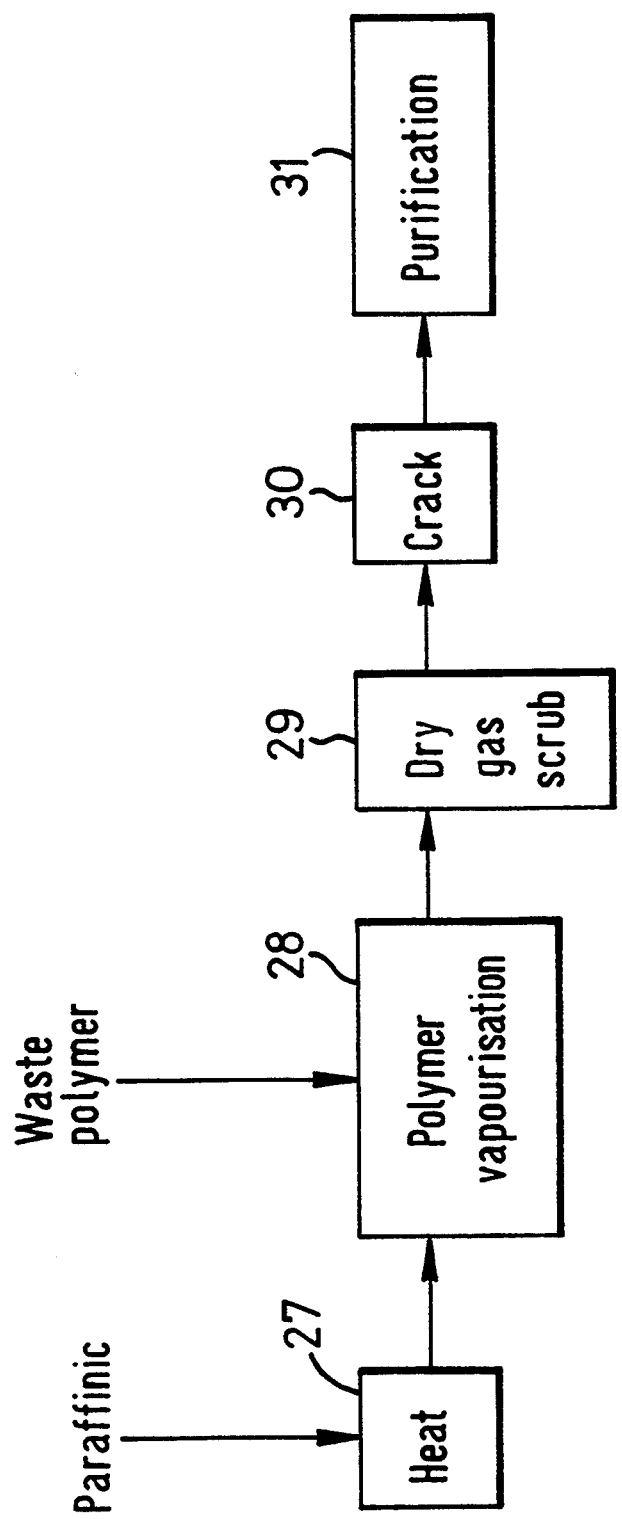

A box diagram appended herewith as FIG. 3 illustrates the sequence of steps used to generate olefins from waste polymers. This diagram shows an integrated process in which a hot paraffinic feedstock (27) is used to fluidise and vapourise waste polymer (28). The mixed hydrocarbon vapour stream, cleaned of acidic impurities (29), is then cracked in a steam cracker (30), and the products separated in a purification stage (31) to recover the olefins.

This process of the present invention is further illustrated with reference to the following Example 13:

The Example outlined below is based on computer modelling of one of our commercial HG04 steam crackers which was actually modified to provide a naphtha cracking capability. The process can, however, be applied to any steam cracker capable of using naphtha type paraffinic feedstock to produce olefins.

Figure 4:
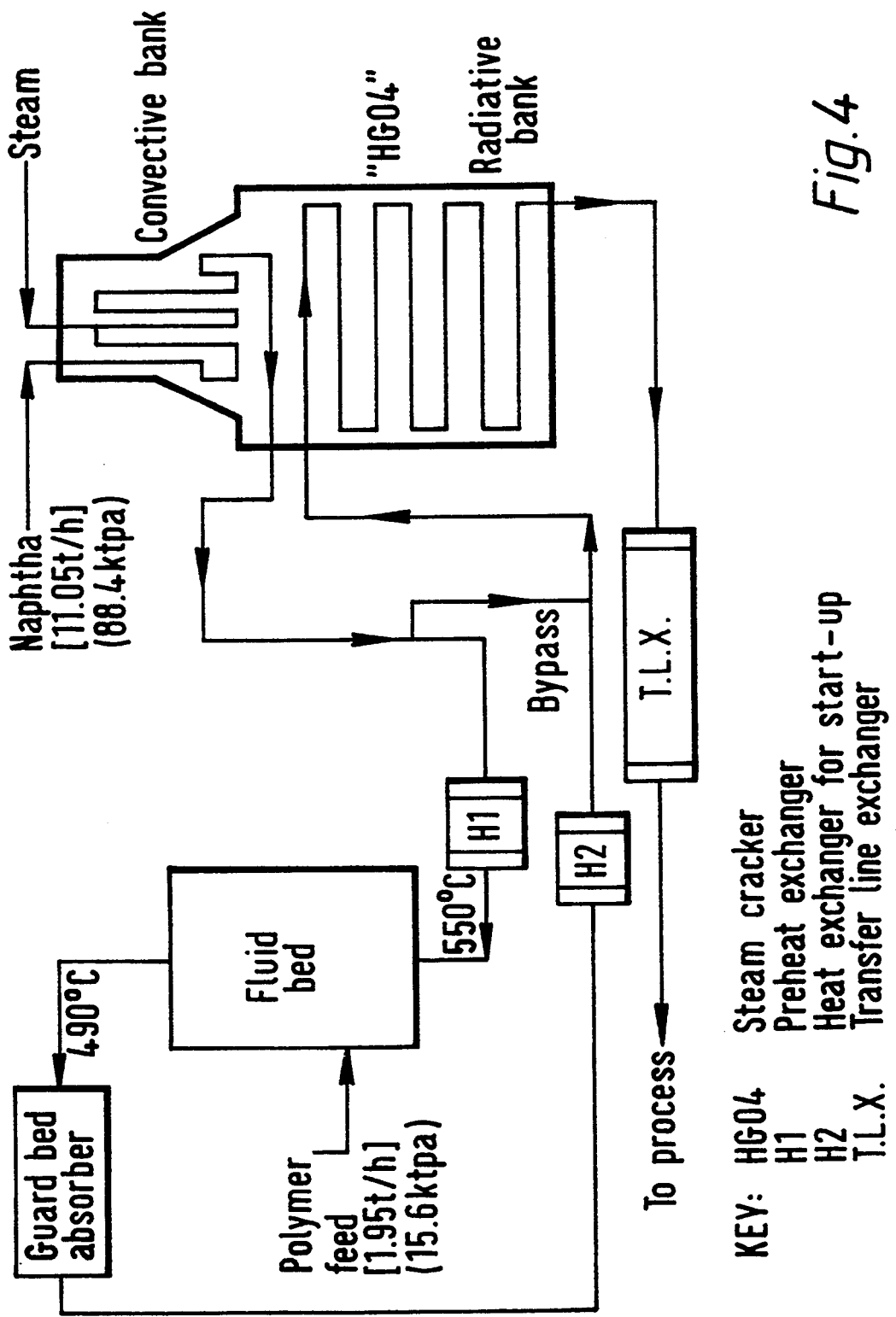

A process flow sheet incorporating the modelled polymer cracking process into a 13 te/hr HG04 steam cracker is shown in FIG.4. appended herewith.

In the process, 11.05 te of naphtha Ca. 6.82 te/hr and steam were pre-heated to 550° C. in the first section of a convective bank of a steam cracker furnace. This heated naphtha and steam stream were fed to the base of the fluidised bed in the vaporiser reactor, where it became both a fluidising medium and a heat source. A by-pass valve was be provided to allow the polymer feed to the cracker to be switched off thereby enabling the steam cracker to operate normally when necessary.

Waste polymer particles shredded to a maximum dimension of 2–4 cm and having a composition shown in Table IV below were screw-fed into the fluidised bed.

TABLE IV

Example 13

| POLYMER TYPE | MASS % |
|---|---|
| POLYETHYLENE | |
| LLDPE | 18 |
| LDPE | 53 |
| HDPE | 7 |
| POLYPROPYLENE | 18 |
| Ethylene-vinylalcohol copolymer | 4 |
| TOTAL | 100 |

A polymer/naphtha ratio of 15:85, based on a heat and mass balance, was used. The fluidised bed was a quartz sand and a sand to polymer ratio of 9:1 v/v was used. The polymer residence time in the bed was dictated by the time taken to vaporise the polymer particles.

Calcium oxide, in slight excess of the stoichiometric requirement was used to remove hydrogen chloride resulting from the PVC content of the polymer feed. This impurity was removed from the fluidised bed as a base stream mixture comprising calcium chloride, calcium oxide and sand.

The naphtha/polymer vapour stream emerging from the fluidised bed at about 490° C. was fed into a cyclone (not shown) to remove any entrained fines, before passing the vapour stream through a guard bed (which contained a further aliquot of calcium oxide) used to remove by scrubbing any remaining traces of HCl from that stream.

The scrubbed vapour stream of naphtha/polymer was then be fed into the radiative bank of the steam cracker. The cracking temperature in the steam cracker was be about 750° to 850° C.

The product yield spectrum resulting from such a process is tabulated in Table V below:

TABLE V

| Component | 15/85 Feed (i) % mass | Naphtha Feed (ii) % mass | Enhancement of Product Yield % |
|---|---|---|---|
| Ethylene | 31.4 | 29.1 | 7.7 |
| Propylene | 17.6 | 17.4 | 1.2 |
| Butadiene | 5.0 | 4.99 | 0.04 |

These figures are based on micro-cracker experiments and have been adjusted to eliminate coking losses.

(i) Yield from a cracker feed of 15% polymer and 85% naphtha.
(ii) Yield from a cracker feed of 100% naphtha.

We claim:

1. A process for producing lower hydrocarbons from waste and/or fresh polymers by pyrolysis, wherein said polymers contain no more than 10% w/w of elements other than carbon and hydrogen, said process comprising vaporizing a feed of waste/fresh polymer pieces in the presence of a fluidizing gas free of molecular oxygen or other oxidizing materials and a fluidized bed of a solid particulate fluidizable material inert to the hydrocarbon reactants and products under the reaction conditions in a reactor at a temperature from 450° to 600° C. to form by pyrolysis a mixed vapor of one or more of light olefins, paraffins, naphthenes, olefin oligomers and waxes.

2. A process according to claim 1 wherein the polymer is one or more of polyethylene, polypropylene and polystyrene.

3. A process according to claim 1 wherein the waste and/or fresh polymer is admixed with a paraffinic feedstock prior to pyrolysis in the reactor.

4. A process for providing one or more light olefins from waste and/or fresh polymers, wherein said polymers contain no more than 10% w/w of elements other than carbon and hydrogen, said process comprising:

(a) vaporizing waste/fresh polymer pieces in the presence of a fluidizing gas free of molecular oxygen or other oxidizing material and a fluidized bed of a solid particulate fluidizable material inert to the hydrocarbon reactants and products under the reaction conditions in a reactor at a temperature from 450° to 600° C. to form by pyrolysis a mixed vapor of one or more of paraffins, light olefins, naphthenes, olefin oligomers and waxes;and (b) cracking said mixed vapor in the presence of steam and at a temperature of at least 600° C.

5. A process according to claim 1 wherein the fluidisable material has a particle size of 100 to 2000 micrometers.

6. A process according to claim 4 wherein the fluidisable material has a particle size of 100 to 2000 micrometers.

7. A process according to claim 1 wherein the fluidising gas is a mixture of gases comprising hydrogen, nitrogen and principally $C_1$ to $C_6$ hydrocarbons.

8. A process according to claim 4 wherein the fluidising gas is a mixture of gases comprising hydrogen, nitrogen and principally $C_1$ to $C_6$ hydrocarbons.

9. A process according to claim 1 wherein the fluidised bed is provided with particulate alkaline solids in order to trap any acidic vapours which are either present in the polymer feed or are formed during the vaporisation reaction.

10. A process according to claim 4 wherein the fluidised bed is provided with particulate alkaline solids in order to trap any acidic vapours which are either present in the polymer feed or are formed during the vaporisation reaction.

11. A process according to claims 4 wherein the mixed lower hydrocarbon vapours emergent from the vaporisation stage are quenched with naphtha and the resultant mixture subjected to steam cracking.

12. A process according to claims 4 wherein the steam cracking is carried out in the substantial absence of a catalyst added from an external source.

13. A process according to 4 wherein the steam cracking is carried out at a temperature from 750°-850° C.

14. A process according to claim 4 wherein the steam cracking is carried out by using a steam to the mixed lower hydrocarbon vapour ratio of 0.2:1 to 1:1 w/w.

15. A process according to claim 4 wherein the waste and/or fresh polymer is admixed with a paraffinic feedstock prior to pyrolysis in the reactor.

* * * * *

UNITED STATES PATENT AND TRADEMARK OFFICE
CERTIFICATE OF CORRECTION

PATENT NO. : 5,364,995
DATED : November 15, 1994
INVENTOR(S) : KENNETH C. KIRKWOOD, STEPHEN A. LENG and DAVID W. SIMS It is certified that error appears in the above-indentified patent and that said Letters Patent is hereby corrected as shown below:

| | |
|---|---|
| Col. 3, line 26, | "The ratio of" should start a new paragraph |
| Col. 5, line 14, | "If the mixed" should start a new paragraph |
| Col. 7, line 47, | should read "106 to 180 µm" |

Signed and Sealed this

Eleventh Day of July, 1995

Attest:

BRUCE LEHMAN

Attesting Officer

Commissioner of Patents and Trademarks